(12) United States Patent
Kelly et al.

(10) Patent No.: US 7,929,952 B2
(45) Date of Patent: Apr. 19, 2011

(54) SYSTEM AND METHOD FOR IMPLEMENTING CLICK-TO-SERVICE

(75) Inventors: Brian T. Kelly, Charlotte, NC (US); Honggang Zhu, Roswell, GA (US); Richard Lifeng Wang, Lewisville, TX (US)

(73) Assignee: Oracle International Corporation, Redwood Shores, CA (US)

( * ) Notice: Subject to any disclaimer, the term of this patent is extended or adjusted under 35 U.S.C. 154(b) by 886 days.

(21) Appl. No.: 11/341,995

(22) Filed: Jan. 27, 2006

(65) Prior Publication Data

US 2007/0061468 A1 Mar. 15, 2007

Related U.S. Application Data

(60) Provisional application No. 60/716,343, filed on Sep. 12, 2005.

(51) Int. Cl.
*H04M 3/42* (2006.01)

(52) U.S. Cl. .................. 455/414.1; 455/414.2; 455/403; 455/411; 705/14.64; 705/44; 709/217; 713/168

(58) Field of Classification Search .... 455/414.1–414.2; 709/202–227; 705/1.1–44, 57, 346
See application file for complete search history.

(56) References Cited

U.S. PATENT DOCUMENTS

| 2002/0073210 | A1  | 6/2002 | Low et al.      |         |
|--------------|-----|--------|-----------------|---------|
| 2002/0103850 | A1  | 8/2002 | Moyer et al.    |         |
| 2003/0018702 | A1* | 1/2003 | Broughton et al.| 709/202 |
| 2004/0122951 | A1* | 6/2004 | Beck et al.     | 709/227 |
| 2005/0193055 | A1* | 9/2005 | Angel et al.    | 709/202 |

OTHER PUBLICATIONS

International Search Report and Written Opinion mailed Jan. 14, 2008 for Application No. PCT/US06/03286.

* cited by examiner

*Primary Examiner* — Kamran Afshar
*Assistant Examiner* — Kathy Wang-Hurst
(74) *Attorney, Agent, or Firm* — Fliesler Meyer LLP

(57) ABSTRACT

A method for providing customer service to a user over a converged channel, said method comprising initiating a service session for a user, accessing a database having user information associated with the user, capturing session information associated with the service session, creating a session SIP message including at least a portion of the user information and at least a portion of the session information, and forwarding the session SIP message to a user agent.

21 Claims, 2 Drawing Sheets

SYSTEM AND METHOD FOR IMPLEMENTING CLICK-TO-SERVICE

CLAIM TO PRIORITY

The present application claims the benefit of:
U.S. Patent Application No. 60/716,343, entitled SYSTEM AND METHOD FOR IMPLEMENTING CLICK-TO-SERVICE, by Brian Kelly, Honggang Zhu and Richard Wang, filed Sep. 12, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention disclosure relates to customer service, and to automatic-service and self-service channels.

BACKGROUND

A broad range of companies, for example companies engaged in consumer products and services, commonly provide service access to customers of products and services provided by such companies. It is common for such access to be in the form of an assisted service channel, such as a call center or a contact center. A call center is a centralized office where incoming telephone calls from customers are routed and answered or outgoing telephone calls are made to customers and potential customers (i.e., telemarketing). A contact center commonly refers to a call center that handles additional functions such as e-mail responses, fax responses, letter responses, etc. More recently, companies have offered access via telephony and public websites having self-service functionality via an automated self-service channel, such functionality possibly including touch-tone menu options, voice recognition, frequently asked question (FAQ) pages, diagnostic tools, live chat, etc. Companies have not typically seen a return out of investment in maintaining contact and call centers. However, company call centers and contact centers are not effectively bridged with self-service channels. Companies have thus far been unable to deliver consistent quality of service across channels. As a consequence, companies struggle to get adoption of their self-service channels. Even frequently used self-service channels suffer from break downs in the quality of service when a user is forced to seek additional help from an assisted service channel, requiring the user to repeat a process of providing some or all of the information previously provided and/or generated via the self-service channel.

DETAILED DESCRIPTION

The invention is illustrated by way of example and not by way of limitation in the figures of the accompanying drawings in which like references indicate similar elements. It should be noted that references to embodiments in this disclosure are not necessarily to the same embodiment, and such references mean at least one.

Customer service over a remote distance has traditionally comprised a user speaking with a service agent over a telephone, or navigating through programmed menu options via an automated response system accessed using a touch-tone telephone. More recently, limited service has been provided via a self-service channel accessed using a computer terminal connected with the Internet. An emerging marketplace exists in which a user accessing a self-service channel can arrange windows of time within which a service agent can contact the user to provide assisted service. Quality of service is predicated on the initiative of the service agent to follow-up and initiate contact. The same problems plaguing assisted service therefore persist. Further, directive marketing firms monitor user activity while accessing a self-service channel. For example, a marketing firm may monitor the time a user spends on a particular page on a website, intruding into the user's session to query whether the user would like to interact with a service agent about the content displayed. An intrusive approach can be annoying to a customer and can provide little substantive help to a customer given the limited contextual information available to the initiating service agent.

Figure 1:
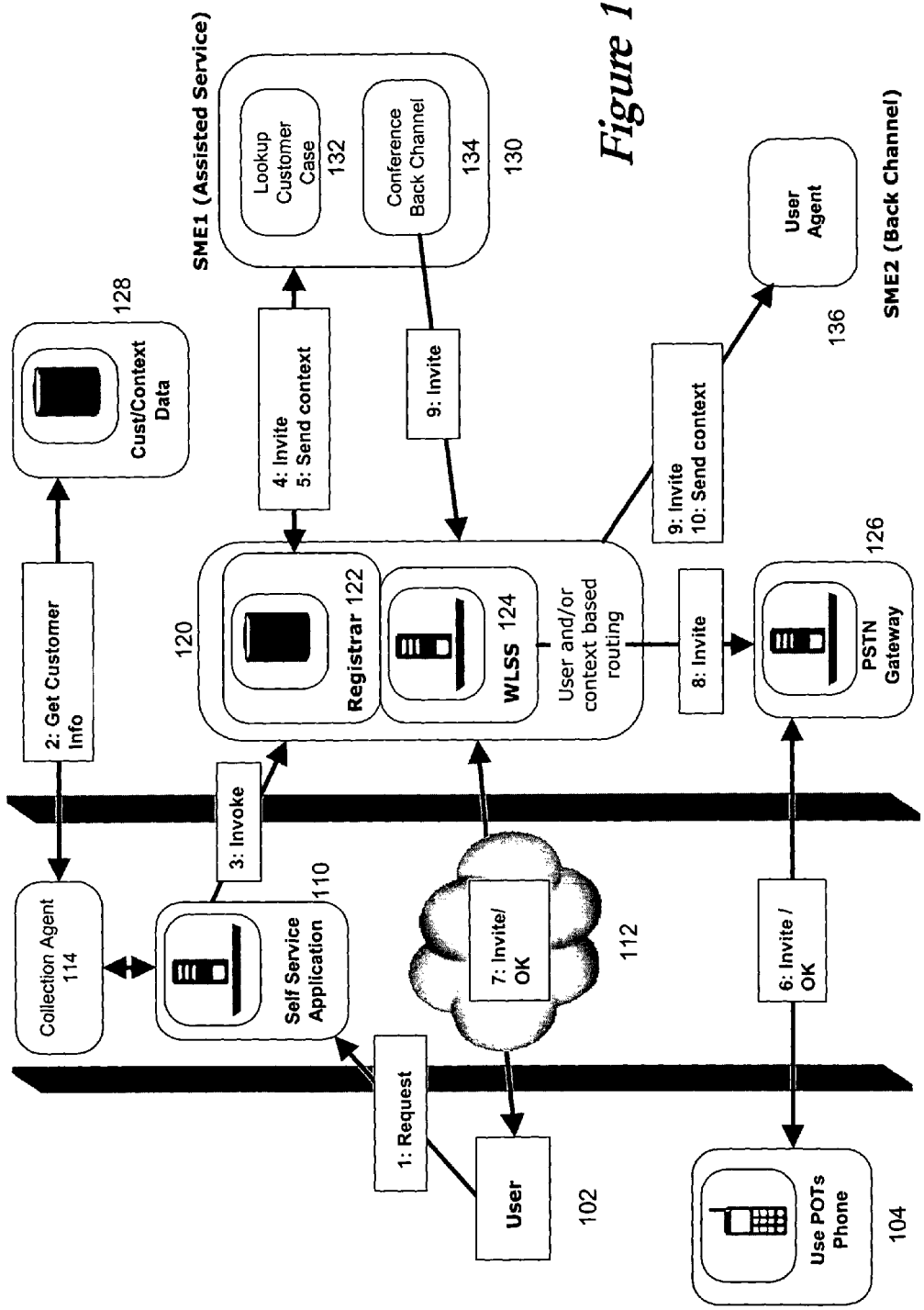
FIG. 1 is a flow diagram of an embodiment of a method and system in accordance with the present invention for bridging automated and assisted service channels.
Figure 2:
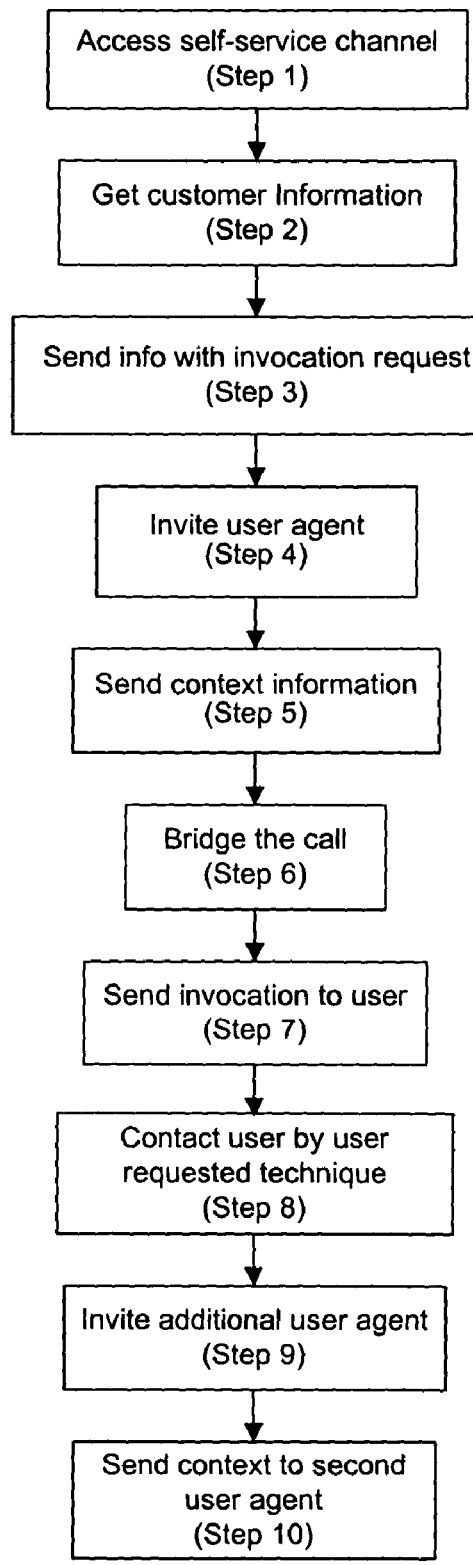
FIG. 2 is a flowchart of an embodiment of the method of FIG. 1.

FIG. 1 is a diagram of an embodiment of a method and a system in accordance with the present invention for bridging assisted service channels and self-service channels to provide improved continuity of service via the converged channel. FIG. 2 is a flow chart of a method as included in the diagram. Such a system and method can reduce a period of time that a user must wait for assisted service, and further reduces the degree of repetition involved in communicating information across channels. The system and method can provide such benefits by capturing at least a portion of the context of a user and at least a portion of the context of the user's session (wherein "context" as used herein includes the content of a user and/or user's session).

The system can be schematically divided into roughly three zones of operation. The first zone is where a user 102 exists and accesses the system. The user 102 can be well away from a company's network, in the public domain. The second zone includes a self-service application 110, which generally is arranged in a publicly accessible space, which can be analogized as a company's "demilitarized zone." Such a publicly accessible space is accessible to the public internet and acts as a gateway into the company's business. The third zone includes servers for directing the user and collecting and storing information. The third zone is fully secure.

A self-service channel can be accessed by a user (also referred to herein as a customer and/or a prospect) 102 by way of a browser-based application, or alternatively by a plain old telephone (POT) user 104 by way of a mobile device, such as a mobile phone, or alternatively some other application, for example, television electronics that communicate with a cable service provider to select a pay-per-view option to view on a television. In the last example, such a service can be helpful when the user is not finding the desired option on a menu page displayed on the television set. Methods and systems in accordance with the present invention can allow the user to "talk" to the television and work with the service provider to determine a solution.

The user 102/104 can access the self-service channel by initiating a session, whether by logging in at a portal, or other website, or by pushing a button on the user's cellphone, etc. The request is routed to an existing self-service application. A customer information collection agent (also referred to herein as a collection agent) can reside and/or be associated with the self-service application. The collection agent links collected information. The collection agent tracks the behavior of that user from the moment the user starts a session. The information is packaged with information obtained from a query to one or more profile services (Step 2). For example, BEA System's Portal accesses a unified user profile (UUP) which pulls information from multiple heterogeneous data sources to aggregate a view of the user attributes. The collection agent can access a plurality of different databases, LDAP (lightweight directory access protocol) directories, or any combination of user informational sources to obtain information about the user, such requests for information having content parameters defined by the service provided to the user or requested by the user. The collection agent can alternatively, or additionally pull information from some other device or technique that captures the context of who the user is and what the user is doing. For example, a user can navigate to a website and authenticate the user's identity. The website can have information about the user's profile, regardless of whether the website exists as a WebLogic™ portal, an apache server, or some other web application server. After some time, the user may need service. Information communicating what the user is trying to accomplish, what the outcome of the session is, and any other information that provides context about both the user and the user's session and optionally additional sessions is associated with the user via the collection agent 114.

The collection agent 114 is invoked when the self-service channel is accessed (Step 1). The collection agent 114 monitors the progress of the user 102 navigating the self-service application 110 and captures the progress or state of the self-service application 110 and information about the user 102. The collection agent 114 packages and forwards the information collected as the self-service channel is bridged to an assisted service channel. The self-service application 110 sends the packaged information with an invocation request to a session-initiating-protocol (SIP) server (Step 3). The SIP server 120 registers session participants (e.g., one or more users), initiates sessions and manages sessions. The collection agent 114 is coupled with the standard SIP protocol and message format. The information from the collection agent 114 becomes part of the context of a SIP message. The context allows the SIP message to route the user 102 to the correct recipient based on criteria. For example, such criteria may include business rules that route a user according to whether the user is a basic customer, or a premium banking customer. The basic customer may be routed to a call-center, while the premium banking customer is assigned to a designated service person.

Available solutions collect an IP address where the user accesses the solution, the time a session is initiated (i.e., the start of a call) and the user agent assisting the user. The collection agent 114 extends data collecting and enables attaching such data to the user 102 using SIP server technology. The collection agent 114 is a configurable utility that can be associated with an existing self-service application 110 to enable an architecture similar to the system of FIG. 1. The scripts and tools available to the self-service application 110 to access customer data, information and session data can be employed by the collection agent 114 to collect, aggregate and package the information, package the information into a SIP message, and then send the request via user datagram protocol (UDT), for example, to the SIP server 120 which determines the next step in the progression of service.

The SIP server 120 can be a standard SIP server, for example such as is used in the telecommunication industry, communicating with the self-service application 110 by way of one or more SIP proxies and by way of one or more different SIP service providers. For example, in an embodiment the SIP server 120 can collectively comprise a BEA WebLogic™ SIP Server (WLSS) 124 operatively coupled with a registrar server 122. In other embodiments fewer, additional, or different components can comprise the SIP server 120. The SIP server 120 leverages the user and context information and routes the request for assistance from the user 102 to the appropriate resource. As shown in FIG. 1, in an embodiment the appropriate resource can be an assisted service channel first subject matter expert (SME1) 130. SME1 130 is a user agent that is determined to be appropriately suited to assist the user 102. The SIP server 124 sends an invite (Step 4) to one or more SME1s 130 to determine if there is an SME1 130 that is ready and listening for calls. The invite informs the SME1 130 that a request for assistance is waiting to be answered and asks the SME1 130 to answer. An SME1 130 can interface with the user 102 in myriad different ways. For example, the SME1 130 can answer a call on a desktop (e.g., an embedded phone in an application on the desktop, a soft phone on the desktop). Once the SME1 130 accepts to answer the call, the SIP server 124 sends the context information (Step 5) and the context information is unwrapped and made available to the SME1 130. For example, the user information can be displayed on the SME1's 130 desktop. As explained above, the context can include such information as: here's the customer, here's their cross-sell, up-sell opportunity, this is the page that they're on within our application, these are the things that they might ask you about, and here are links to that content in case you need to service the customer at a level below what you normally know.

With a populated view of the user, the SME1 130 can bridge the call by way of voice-over-IP (VOIP) 112 and/or analog telephony technology 104 interfaced through the Public Switched Telephone Network (PSTN) gateway infrastructure 126 (Step 6) or alternatively some other mode of communication, such as a chat session. The medium of communication is secondary to the fact of communication between the user 102 and the user agent 130. An invocation is directed back to the user 102 (Step 7). The user 102 may prefer to schedule a call-back, rather than bridging to an assisted service channel. Under such circumstances, the user 102 can optionally enter preferred contact information or select preferred contact information instructing a time and method to be contacted by the SME1 130. For example, the user 102 can be contacted by way of an office phone, a home phone, a home phone, a mobile phone, etc. 104 (Step 8). The user 102 can select to work with the self-service application, with a preferred method of receiving assisted service being through a phone instead of their computer.

Once the user 102 and SME1 130 are connected, the capability exists to call conference with context. The collection agent 112 continues to gather information once the session has been bridged to the assisted service channel, allowing additional and/or substitute actors to join and/or take over assistance being fully aware of the information exchanged between the user 102 and SME1 130. For example, if an SME1 130 has reached a point where assistance needs to be escalated, or if the SME1 130 decides to introduce an additional user agent, SME1 130 can invite the additional assisted service channel second subject matter expert (SME2) 136 using a conference back channel (Step 9). For example, where a bank customer seeks assistance with a Visa account and the initial user agent assists the bank customer only to find that the customer has a special Preferred plan dividend miles Visa managed by a separate group, the initial user agent can bridge a second user agent from the appropriate group to assist the bank customer. Rather than placing the bank customer into a queue to explain the information to the next user agent, the information from the interaction between the bank customer and the initial user agent is packaged along with the information passed to the initial user agent and transferred to the second user agent (Step 10). To accomplish this transfer, the context is sent by way of a SIP message along with the invite. The context information is unpacked for SME2 136 using whatever application SME2 136 uses. As provided in this example, SME2 136 operates in a different service group; however, in other embodiments SME2 can exist within the same service group as SME1 130, but have a different level of expertise. In such a scenario, a transfer can be an escalation.

Methods and systems in accordance with the present invention can be applied to one or more of click-to-call, click-to-dial, and click-to-chat applications, thereby extending such applications with rich context that exists in the self-service application 110. In self-service applications 110 commonly employed, a user requests assisted service by providing a contact telephone number, which a user agent is then assigned to call back within a designated time window. Commonly, the contact telephone number is entered into a database, and is placed in a user agent's queue. The user agent is responsible for contacting the user. The requirement for human intervention often reduces the average quality of response. Further, the user agent contacting the user must collect at least some of the information previously provided by the user.

The SIP application architecture can hold a user's place in line for a scheduled call-back, meaning that the call-back does not require the initiative of the user agent to access a database and to make a service call. Rather, the call-back is placed in a queue based on the times that the user specifies that the user be contacted. Calls are automatically routed to a call-center, or other pool of user agents, and the user agents accept the calls as they're assigned. Such a technique reduces a reliance on human initiative and attention, as required in such solutions as Webline, from Cisco and Estara, companies that provide limited click-to-dial, click-to-call functionality.

The collection agent is a configurable utility that allows plugging into a self-service application and accessing customer information and/or session data to define the context of what that customer is doing and who they are. The SIP server determines where a user's session is routed, or otherwise communicably arranged. A utility unpackages the context data and uses the data drive applications, for example such as Clarify and CBOL and other CRM type tools that exist within some contact centers. For example, in an embodiment of a system and method in accordance with the present invention, a user navigating a self-service channel can request assisted service. A call center associate (a customer service representative (CSR)) can be assigned to assist the user. Before the CSR clicks the button to engage the user (e.g., via voice-to-voice communication) an aggregate view arranges itself on the CSR's desktop communicating the user's information, including what the user has done so far within the session. The collection agent can be integrated with existing infrastructure, for example such as BEA System's Legacy infrastructure, or alternatively, a single application can be constructed to execute the functions of the collection agent and SIP server. Even to the point where we can hook into there existing computer telephony info. We can drive their automated call dialers. We could leverage routing tech that all ready exists there for large call centers where you would need to manage and reduce the volume of your calls, etc.

In many circumstances, the nature of a software solution requires clustering (e.g., Weblogic™ server). Clustering adds additional servers performing redundant tasks. Embodiments of methods need not distinguish between primary severs and clustering servers.

In an embodiment, at least a portion of the method can be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

In an embodiment, at least a portion of the method includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments and/or containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for providing a service with a provider over a converged channel including an assisted service channel and a self-service channel, the method comprising:
    initiating a service session for a user by providing at least one of the assisted service channel and the self-service channel;
    determining content parameters for use in assembling user profile information requests based on one or both of a service requested by the user and a service provided to the user during the initiated service session;
    requesting user profile information based on the content parameters from a plurality of heterogeneous data sources,
    wherein one or more of the heterogeneous data sources is a third party profile service having a relationship with the user independent of the provider, the third party profile service being accessible by way of an external website which requires authentication by the user to provide user profile information;

receiving user profile information from at least one of the heterogeneous data sources;

wherein the determining, requesting, and receiving steps are performed during the service session;

aggregating the received user profile information after the receiving step is performed;

capturing session information associated with the service session;

creating a session message including at least a portion of the aggregated user profile information and at least a portion of the session information; and forwarding the session message to a user agent for use in the assisted service channel.

2. The method of claim 1, wherein the session message is a SIP message; and further comprising:

accessing the session SIP message; and displaying the at least a portion of the user profile information and at least a portion of the session information to the user agent.

3. The method of claim 2, further comprising:

connecting the user with the user agent.

4. The method of claim 1, wherein:

the session message is a SIP message initiating a service session for a user includes providing the self-service channel to a user;

the session information is self-service session information;

the session SIP message is a self-service session SIP message; and the user agent is a first user agent; and wherein the method further comprises:

capturing first user agent session information;

creating a first user agent session SIP message including the self-service session SIP message and at least a portion of the first user agent session information; and forwarding the first user agent SIP message to a second user agent.

5. The method of claim 4, wherein the session message is a SIP message; and further comprising:

accessing the self-service session SIP message;

displaying the user profile information and the self-service session information to the first user agent;

accessing the first user agent session SIP message; and displaying the user profile information, the self-service session information, and the first user agent session information to the second user agent.

6. The method of claim 1, further comprising:

scheduling a contact time for the user; and reinitiating the session at approximately the contact time.

7. The method of claim 6, wherein the session is reinitiated by way of a designated communication device.

8. The method of claim 7, wherein the designated communication device is one or both of digital communication and analog telephony.

9. The method of claim 4, wherein the self-service channel includes one or both of a web-browser-based application and an automated response system.

10. A method for providing a service with a provider over a converged channel including an assisted service channel and a self-service channel, the method comprising:

initiating a service session for a user, including providing the self-service channel to the user;

determining content parameters for use in assembling user profile information requests based on one or both of a service requested by the user and a service provided to the user during the initiated service session;

requesting user profile information based on the content parameters from a plurality of heterogeneous data sources, wherein one or more of the heterogeneous data sources is a third party profile service having a relationship with the user independent of the provider, the third party profile service being accessible by way of an external website which requires authentication by the user to provide user profile information;

receiving user profile information from at least one of the heterogeneous data sources;

wherein the determining, requesting, and receiving steps are performed during the service session;

aggregating the received user profile information after the receiving step is performed;

capturing self-service session information associated with the service session;

creating a self-service session SIP message including at least a portion of the aggregated user profile information and at least a portion of the self-service session information;

forwarding the self-service session SIP message to a user agent for use in the assisted service channel;

accessing the self-service session SIP message;

displaying the at least a portion of the aggregated user profile information and at least a portion of the self-service session information to the user agent; and connecting the user with the user agent to engage the assisted service channel.

11. The method of claim 10, wherein the user agent is a subject matter expert.

12. The method of claim 10, wherein the user agent is a first user agent; and the method further comprises:

capturing first user agent session information;

creating a first user agent session SIP message including the self-service session SIP message and at least a portion of the first user agent session information;

forwarding the first user agent SIP message to a second user agent, accessing the first user agent session SIP message;

displaying the user profile information, the self-service session information, and the first user agent session information to the second user agent; and connecting the user with the second user agent.

13. The method of claim 12, wherein:

the first user agent is a first subject matter expert;

the second user agent is a second subject matter expert; and the first subject matter expert has one of greater or lesser depth of knowledge than the second subject matter expert.

14. The method of claim 12, wherein:

the first user agent is a first subject matter expert;

the second user agent is a second subject matter expert; and the first subject matter expert has one of an overlapping sphere of knowledge and a mutually exclusive sphere of knowledge than the second subject matter expert.

15. The method of claim 10, further comprising:

scheduling a contact time for the user; and reinitiating the session at approximately the contact time.

16. The method of claim 15, wherein the session is reinitiated by way of a user designated communication device.

17. The method of claim 16, wherein the user designated communication device is one or both of digital communication and analog telephony.

18. A system for providing a service with a provider to a user over a converged channel, the system comprising:
- a self-service channel;
- an assisted service channel;
- a user interface device adapted to communicate with one of the self-service channel and the assisted service channel;
- a collection agent for use during a service session and including instructions to:
  - capture session information associated with the service session;
  - determine content parameters for use in assembling user profile information requests based on one or both of a service requested by the user and a service provided to the user during the initiated service session;
  - request user profile information related to the user based on the content parameters from a plurality of heterogeneous data sources,
  - wherein one or more of the heterogeneous data sources is a third party profile service having a relationship with the user independent of the provider, the third party profile service being accessible by way of an external website which requires authentication by the user to provide user profile information to the collection agent;
  - receive user profile information from at least one of the heterogeneous data sources;
  - aggregate the received user profile information after receiving the user profile information; and
- a SIP server adapted to communicate with both of the self-service channel and the assisted service channel, the SIP server further being adapted to package the session information and aggregated user profile information into a SIP message and associate the SIP message with the user.

19. The system of claim 18, wherein the self-service channel is one or both of a web-browser-based application and an automated response system.

20. The system of claim 18, wherein the assisted-service channel is at least one of a web browser-based application, a chat protocol, a VoIP device, or analog telephony.

21. The system of claim 1, wherein the external website is adapted to allow the service to access the user profile information by default or on condition that the user authenticates the user's identity during the service session.

* * * * *

UNITED STATES PATENT AND TRADEMARK OFFICE
CERTIFICATE OF CORRECTION

| | | |
|---|---|---|
| PATENT NO. | : 7,929,952 B2 | Page 1 of 1 |
| APPLICATION NO. | : 11/341995 | |
| DATED | : April 19, 2011 | |
| INVENTOR(S) | : Kelly et al. | |

It is certified that error appears in the above-identified patent and that said Letters Patent is hereby corrected as shown below:

In column 5, line 61, delete "there" and insert -- their --, therefor.

Signed and Sealed this
Fourth Day of October, 2011

David J. Kappos
*Director of the United States Patent and Trademark Office*